US009785656B2

(12) United States Patent
Sorakado

(10) Patent No.: US 9,785,656 B2
(45) Date of Patent: Oct. 10, 2017

(54) DATA PROCESSING APPARATUS FOR CLUSTERING TIME-SERIES DATA BASED ON GENERATED REFERENCE VALUES AND DATA PROCESSING METHOD FOR SAME

(71) Applicant: CANON KABUSHIKI KAISHA, Tokyo (JP)

(72) Inventor: Hideki Sorakado, Asaka (JP)

(73) Assignee: Canon Kabushiki Kaisha, Tokyo (JP)

(*) Notice: Subject to any disclaimer, the term of this patent is extended or adjusted under 35 U.S.C. 154(b) by 338 days.

(21) Appl. No.: 14/526,835

(22) Filed: Oct. 29, 2014

(65) Prior Publication Data
US 2015/0142805 A1 May 21, 2015

(30) Foreign Application Priority Data

Nov. 19, 2013 (JP) .................. 2013-239237

(51) Int. Cl.
*G06F 17/30* (2006.01)

(52) U.S. Cl.
CPC ................ *G06F 17/3028* (2013.01)

(58) Field of Classification Search
CPC .................................. G06F 17/3028
See application file for complete search history.

(56) References Cited

U.S. PATENT DOCUMENTS

| 9,547,710 B2* | 1/2017 | Marvasti ........... G06F 17/30548 |
| 2004/0088722 A1* | 5/2004 | Peker ................ G06F 17/30787 |
| | | 725/19 |
| 2009/0327173 A1* | 12/2009 | Lee .................... G06F 17/30598 |
| | | 706/12 |
| 2010/0030521 A1* | 2/2010 | Akhrarov ............... G06K 9/622 |
| | | 702/182 |
| 2014/0282011 A1* | 9/2014 | Dellinger .......... G06F 17/30256 |
| | | 715/731 |
| 2015/0019554 A1* | 1/2015 | Hall ..................... G06K 9/6222 |
| | | 707/737 |

FOREIGN PATENT DOCUMENTS

JP          2009-99120 A          5/2009

OTHER PUBLICATIONS

Platt et al. "PhotoTOC: Automatic Clustering for Browsing Personal Photographs" (Information, Communications and Signal Processing, 2003 and Fourth Pacific Rim Conference on Multimedia) Proceedings of the 2003 Joint Conference of the Fourth International Conference, 2003, vol. 1, pp. 6-10.

* cited by examiner

*Primary Examiner* — Richard Bowen
(74) *Attorney, Agent, or Firm* — Fitzpatrick, Cella, Harper & Scinto

(57) ABSTRACT

To obtain a clustering result which is less unnatural to the user, a data processing apparatus clusters at least one data arranged in time-series; generates, if new data is added, a reference value for defining a group division criterion in the clustering using at least one existing data that exists forward of the new data in time-series after a forward boundary; and determines based on the reference value whether a group division boundary exists between the new data and existing data positioned immediately before the new data.

10 Claims, 10 Drawing Sheets

| IMAGE ID | PHOTOGRAPHING TIME | PHOTOGRAPHING PERIOD | IMAGE BODY DATA |
|---|---|---|---|
| Image001 | 2012/09/01 10:00:10 | 0 | ... |
| Image002 | 2012/09/01 10:00:30 | 0 | ... |
| Image003 | 2012/09/01 14:01:30 | 0 | ... |
| Image004 | 2012/09/01 14:02:00 | 0 | ... |

200b

| INTERVAL ID | IMAGE ID | IMAGE ID | PRESENCE/ ABSENCE OF BOUNDARY |
|---|---|---|---|
| B001 | Image001 | Image002 | False |
| B002 | Image002 | Image003 | True |
| B003 | Image003 | Image004 | False |
| B004 | Image004 | Image005 | False |

FIG. 6

| | DETERMINATION EQUATION | PARAMETER | REFERENCE DATA UPDATE EQUATION | VIRTUAL DATA |
|---|---|---|---|---|
| LOG-NORMAL DISTRIBUTION | $f(x) = \dfrac{1}{\sqrt{2\pi\sigma^2}\,x}\, e^{-\dfrac{(\ln(x)-\mu)^2}{2\sigma^2}}$ <br><br> $L(x) = \dfrac{\ln(2\pi\sigma^2)}{2} + \ln(x) + \dfrac{(\ln(x)-\mu)^2}{2\sigma^2}$ | $\mu$ <br><br> $\sigma^2 = \xi - \mu^2$ | $n_{t+1} = n_t + 1$ <br><br> $\mu_{t+1} = \dfrac{n_t \times \mu_t + \ln(x_{t+1})}{n_t + 1}$ <br><br> $\xi_{t+1} = \dfrac{n_t \times \xi_t + \ln^2(x_{t+1})}{n_t + 1}$ | $n_0$ <br> $\mu_0$ <br> $\xi_0$ |
| NORMAL DISTRIBUTION | $f(x) = \dfrac{1}{\sqrt{2\pi\sigma^2}}\, e^{-\dfrac{(x-\mu)^2}{2\sigma^2}}$ <br><br> $L(x) = \dfrac{\ln(2\pi\sigma^2)}{2} + \dfrac{(x-\mu)^2}{2\sigma^2}$ | $\mu$ <br><br> $\sigma^2 = \xi - \mu^2$ | $n_{t+1} = n_t + 1$ <br><br> $\mu_{t+1} = \dfrac{n_t \times \mu_t + x_{t+1}}{n_t + 1}$ <br><br> $\xi_{t+1} = \dfrac{n_t \times \xi_t + x^2_{t+1}}{n_t + 1}$ | $n_0$ <br> $\mu_0$ <br> $\xi_0$ |
| EXPONENTIAL DISTRIBUTION | $f(x) = \lambda e^{-\lambda x}$ <br><br> $L(x) = -\ln(\lambda) + \lambda x$ | $\lambda = 1/\mu$ | $n_{t+1} = n_t + 1$ <br><br> $\mu_{t+1} = \dfrac{n_t \times \mu_t + x_{t+1}}{n_t + 1}$ | $n_0$ <br> $\mu_0$ |

DATA PROCESSING APPARATUS FOR CLUSTERING TIME-SERIES DATA BASED ON GENERATED REFERENCE VALUES AND DATA PROCESSING METHOD FOR SAME

BACKGROUND OF THE INVENTION

Field of the Invention

The present invention relates to data processing and, more particularly, to a clustering apparatus for grouping/classifying data.

Description of the Related Art

Conventionally, image data photographed by a digital camera or the like are clustered for each event. For example, Japanese Patent Laid-Open No. 2009-099120 (patent literature 1) discloses a technique of determining the boundary between events using the photographing interval between adjacent image data when a plurality of image data are arranged in a photographing time order. Furthermore, a technique of performing clustering by determining the presence/absence of a boundary based on the photographing intervals between a plurality of image data included within a neighboring time range is disclosed by John C. Platt, Mary Czerwinski, Brent A. Field, et al. "PhotoTOC: Automatic Clustering for Browsing Personal Photographs" (Information, Communications and Signal Processing, 2003 and Fourth Pacific Rim Conference on Multimedia. Proceedings of the 2003 Joint Conference of the Fourth International Conference on., 2003, Vol. 1, pp. 6-10.) (Non-patent literature 1).

The above-described conventional technique, however, assumes that all image data to be clustered are collected, and then collectively clustered. Therefore, when image data is newly added, clustering is performed again, resulting in a change in clustering result. If, therefore, clustering processing is performed at high frequency, every time a clustering result is displayed, the clustering result for the respective image data changes, and thus the user may feel that it is unnatural.

If image data that influence on determination are accumulated and then clustered when using only photographing intervals close to a determination target, as in non-patent literature 1, it is possible to perform clustering while adding image data. In this case, however, it is impossible to provide a clustering result during accumulation. When, for example, it is required to accumulate about 10 image data forward and backward of the determination result, if the average photographing interval is about 90 sec, an accumulation time of about 15 min is required to accumulate 10 image data backward of the determination point. During this time, it is impossible to provide a clustering result.

If clustering is performed with reference to only the forward images of the determination target, it is not necessary to accumulate backward images. In this case, however, if there is no forward image, for example, at the start point of a photo row, it is impossible to perform determination. In addition, as in non-patent literature 1, when a reference range is designated by a fixed number of images, it is necessary to refer a larger number of forward images. As a result, a range including a long photographing interval that is determined as a boundary may be referred to, and boundary determination cannot be correctly performed in some cases.

SUMMARY OF THE INVENTION

According to one aspect of the present invention, a data processing apparatus comprises: a clustering unit configured to cluster at least one data arranged in time-series; a generation unit configured to, if new data is added, generate a reference value for defining a group division criterion in the clustering using at least one existing data that exists forward of the new data in time-series after a forward boundary; and a determination unit configured to determine based on the reference value whether a group division boundary exists between the new data and existing data positioned immediately before the new data.

According to another aspect of the present invention, a data processing method of clustering at least one data arranged in time-series, comprises: generating, if new data is added, a reference value for defining a group division criterion in the clustering using at least one existing data that exists forward of the new data in time-series after a forward boundary; and determining based on the reference value whether a group division boundary exists between the new data and existing data positioned immediately before the new data.

The present invention provides a clustering technique capable of obtaining a clustering result which is less unnatural to the user.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows tables for explaining management of image data;

FIG. 6 is a table for explaining determination equations, parameters, reference data update equations, and virtual data for each probability distribution model;

DESCRIPTION OF THE EMBODIMENTS

Preferred embodiments of the present invention will be described in detail below with reference to the accompanying drawings. Note that the following embodiments are merely examples, and do not intend to limit the scope of the invention.

(First Embodiment)

An image capturing apparatus will be exemplified as the first embodiment of a data processing apparatus according to the present invention.

<Apparatus Arrangement>

Figure 1A:
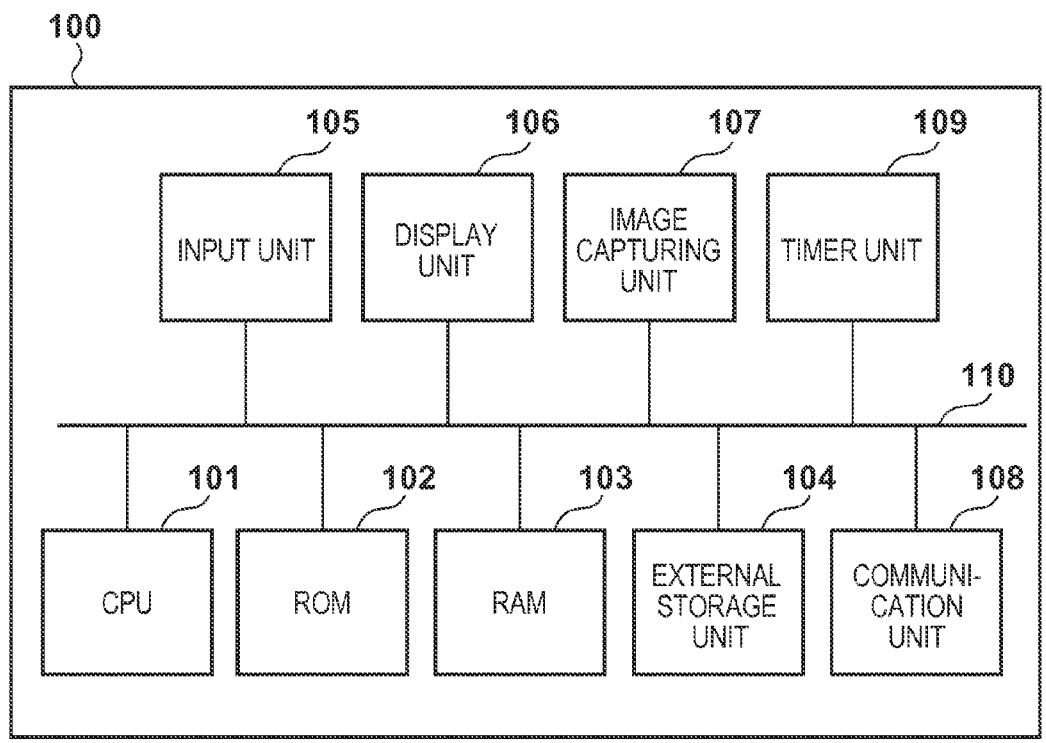
FIGS. 1A and 1B are block diagrams for explaining the arrangement of an image capturing apparatus and screen display, respectively.

FIG. 1A is a block diagram showing the arrangement of an image capturing apparatus 100 according to the first embodiment. A CPU 101 serves as a function unit for controlling the image capturing apparatus 100 as a whole. A ROM 102 serves as a function unit storing programs and parameters that need not be changed. A RAM 103 serves as a function unit for temporarily storing programs and data supplied from an external apparatus and the like. An external storage unit 104 is a hard disk or memory card fixedly installed in the image capturing apparatus 100. The external storage unit 104 is implemented by, for example, a flexible disk (FD), optical disk (CD, DVD, or the like), magnetic card, optical card, IC card, or memory card.

An input unit 105 serves as a function unit for inputting data in response to a user operation, and includes a power button, image capturing button, image display button, four-way selector button, OK button, and touch panel. A display unit 106 serves as a function unit for displaying held data and supplied data, and includes a liquid crystal display. An image capturing unit 107 serves as a function unit for creating image data such as a still image or moving image using a condensing optical system such as a lens and an image sensor such as a CCD. A communication unit 108 serves as a function unit for performing wired/wireless communication to connect to the Internet or the like. A timer unit 109 serves as a function unit for measuring the time, and manages the current time. A system bus 110 serves as a function unit for communicably connecting the above-described respective function units to each other.

Figure 3:
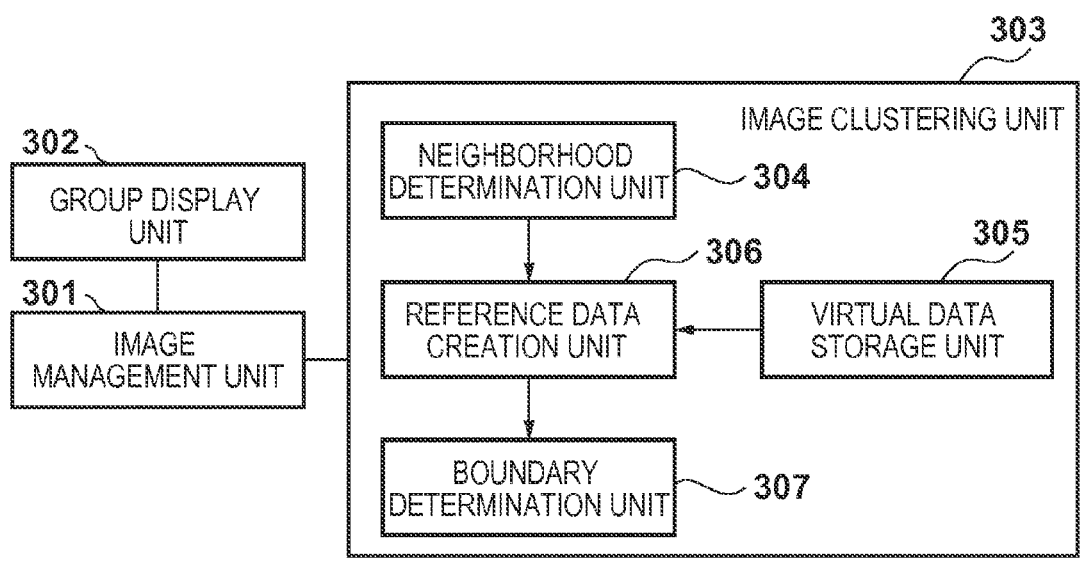
FIG. 3 is a block diagram showing the arrangement of an image management program (first embodiment)

In the following description, assume that an image management program to be described later with reference to FIG. 3 is stored in the ROM 102, and executed by the CPU 101. The image management program may be stored in the external storage unit 104, as a matter of course.

<Data to be Clustered>

In the first embodiment, a case in which image data are used as data to be clustered will be explained. Especially, a case will be described in which when newly adding image data to the external storage unit 104, clustering is performed while sequentially determining whether there is a "boundary" immediately before the image data. That is, it is sequentially determined whether the image data to be newly added and existing image data already stored in the external storage unit 104 should be clustered in different groups.

FIG. 2 shows tables for explaining management of image data used in the first embodiment. As shown in a table 200a, each image data is a photo image data, and includes an image ID, photographing time, photographing period, and image body data.

The image ID indicates an identifier for specifying the image. The photographing time indicates date/time information when the image is photographed. The photographing period indicates information representing a period during which a moving image or the like is photographed. In the case of a still image, "0" is recorded as the photographing period. The image body data indicates pixel information or the like of the image. Note that the image body data is omitted in FIG. 2.

Note that the image body data may be referred to using the file path of the image file stored in the external storage unit or the like. In this case, when the image body data is necessary, data indicated by the file path on the external storage unit is specified. Note that the data representation of the image data is not limited to this.

The "photographing interval" between image data is defined as the difference between the photographing times of two image data adjacent to each other in time-series. Note that for the image data of a moving image, the photographing interval including the photographing period may be calculated. That is, with respect to two image data adjacent to each other in time-series, the difference between "the photographing time of image data with a later photographing time" and "the time obtained by adding the photographing period to the photographing time of image data with an earlier photographing time" may be set as the "photographing interval". A method of obtaining the photographing interval is not limited to this.

The order of the photographing times of the image data is defined as a photographing order. Note that a value indicating a photographing order may be held for each image data in addition to the photographing time, and the order of the values may be defined as a photographing order. A method of obtaining the photographing order is not limited to this.

A table 200b describes boundary information output from an image clustering unit. The boundary information includes information for specifying the position of the "photographing interval" between two image data adjacent to each other in time-series, and information indicating whether there is a "boundary" during the "photographing interval". For example, the boundary information includes an "interval ID", two "image IDs", and "the presence/absence of a boundary". As for the presence/absence of a boundary, a value "True" indicates that there is a "boundary" between the image data indicated by the two image IDs. On the other hand, a value "False" is set when there is no "boundary". The image data can be grouped by arranging the image data in the photographing order (that is, in time-series), and dividing the image data row at the position of a "boundary".

Note that the position of the "photographing interval" can be specified by only one of the two image IDs, instead of the two image IDs. Therefore, only one of the image IDs may be held. Alternatively, the intermediate time between the photographing times indicated by the two image IDs may be held. Using such boundary information makes it possible to group/classify a plurality of image data by arranging the image data in the photographing order, and dividing them at the position of a photographing interval whose "presence/absence of a boundary" is "True". Note that the representation of the boundary information is not limited to them.

<Arrangement of Image Management Program>

FIG. 3 is a block diagram showing the arrangement of the image management program according to the first embodiment.

An image management unit 301 stores image data, and manages the image data by classifying them into groups. More specifically, image data obtained by the image capturing unit 107 are stored in the external storage unit 104. Furthermore, boundary information is obtained by an image clustering unit 303, and stored in the external storage unit 104. Alternatively, the image data are managed by classifying the image data into groups using the boundary information.

Figure 1B:
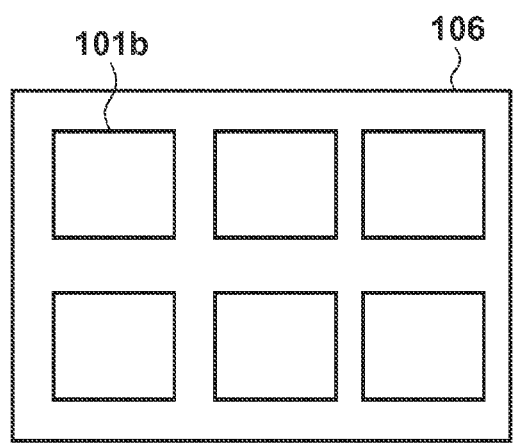

A group display unit 302 classifies the image data stored in the image management unit 301 into groups, and displays them on the display unit 106. When, for example, pressing of the image display button of the image capturing apparatus 100 is detected via the input unit 105, a group display screen shown in FIG. 1B is displayed. Referring to FIG. 1B, representative images 101b of the groups are listed and displayed. The first image data in each group (image data with the earliest photographing time) is used as the representative image of the group. Alternatively, image data selected from each group according to another criterion may be used. The group display screen may also be displayed on a timeline. Note that a method of displaying the groups is not limited to them.

The image clustering unit 303 clusters (groups and divides) one or more image data. More specifically, when the image capturing unit 107 photographs image data, it is decided whether there is a boundary between the image data and immediately preceding photographed image data. The image clustering unit 303 includes a neighborhood determination unit 304, a virtual data storage unit 305, a reference data creation unit 306, and a boundary determination unit 307.

Figure 4:
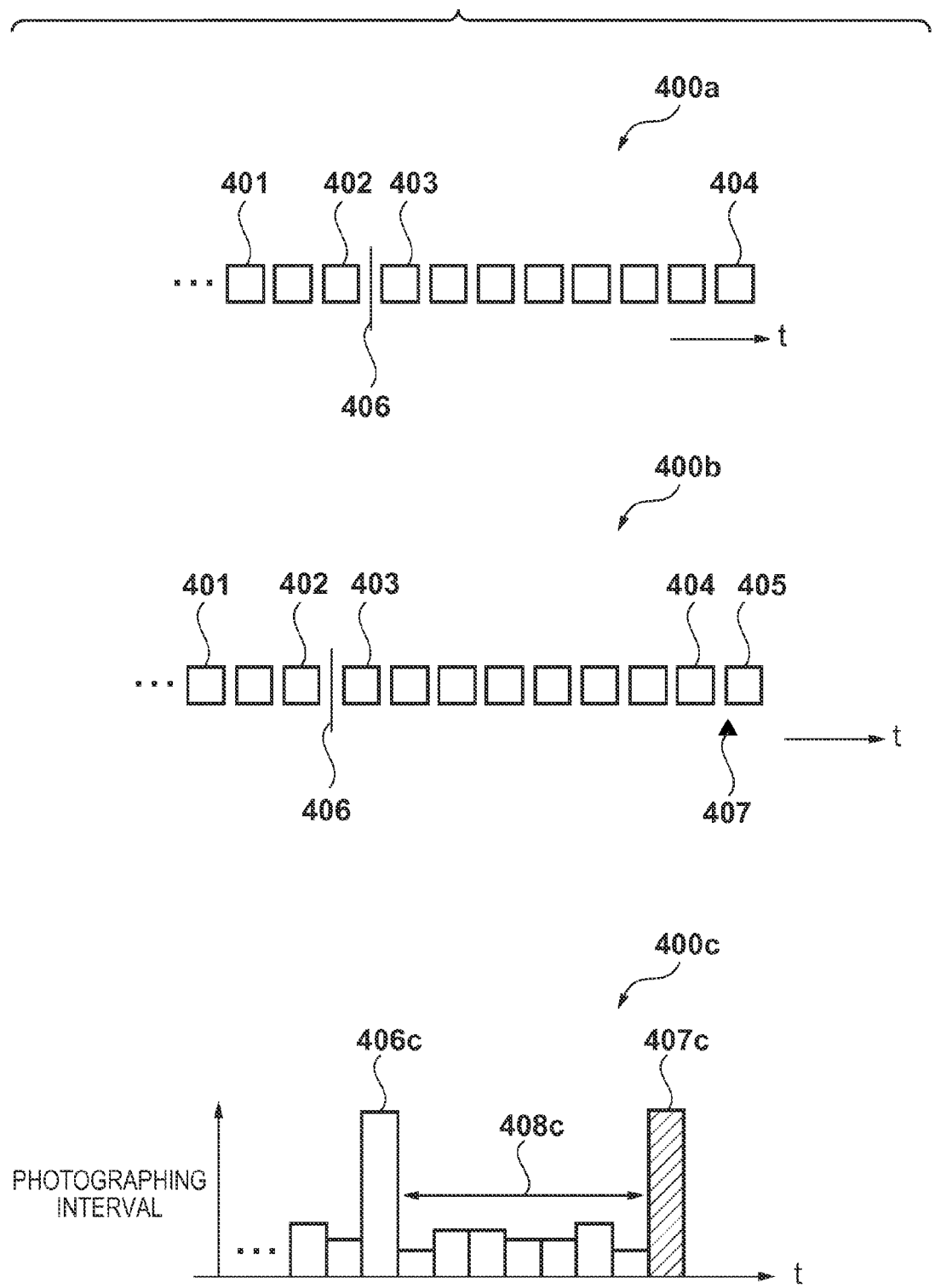
FIG. 4 is a view for explaining an overview of boundary determination.

FIG. 4 is a view for explaining an overview of boundary determination. Terms associated with boundary determination will also be described with reference to FIG. 4. In an image data row 400a, image data 401 to 404 arranged in the photographing order are divided into two groups by setting an interval 406 as a boundary. That is, the image data are divided into a group of image data photographed before the interval 406 and a group of image data photographed after the interval 406.

With respect to the time-series direction, terms "forward" and "backward" are used. The term "forward" indicates the earlier photographing time side. For example, the image data 401 is represented as being positioned forward of the interval 406. To the contrary, "backward" indicates the later photographing time side. For example, the image data 403 is represented as being positioned backward of the interval 406.

When image data is newly photographed, new image data 405 is added to the end of an image data row in time-series, as indicated by an image data row 400b. In this case, the image clustering unit 303 determines whether there is a boundary in an interval 407 between the image data 404 and 405. The interval 407 for which the presence/absence of a boundary is determined will be referred to as a "determination target" interval hereinafter.

A bar graph 400c expresses the length of the photographing interval between the image data of the image data row 400b. For example, a photographing interval 406c corresponds to the interval 406 of the image data row 400b. A photographing interval 407c corresponds to the determination target interval 407 of the image data row 400b. Note that the earlier side will be referred to as "forward" and the later side will be referred to as "backward" as for the determination target, similarly to the image data.

Figure 10:
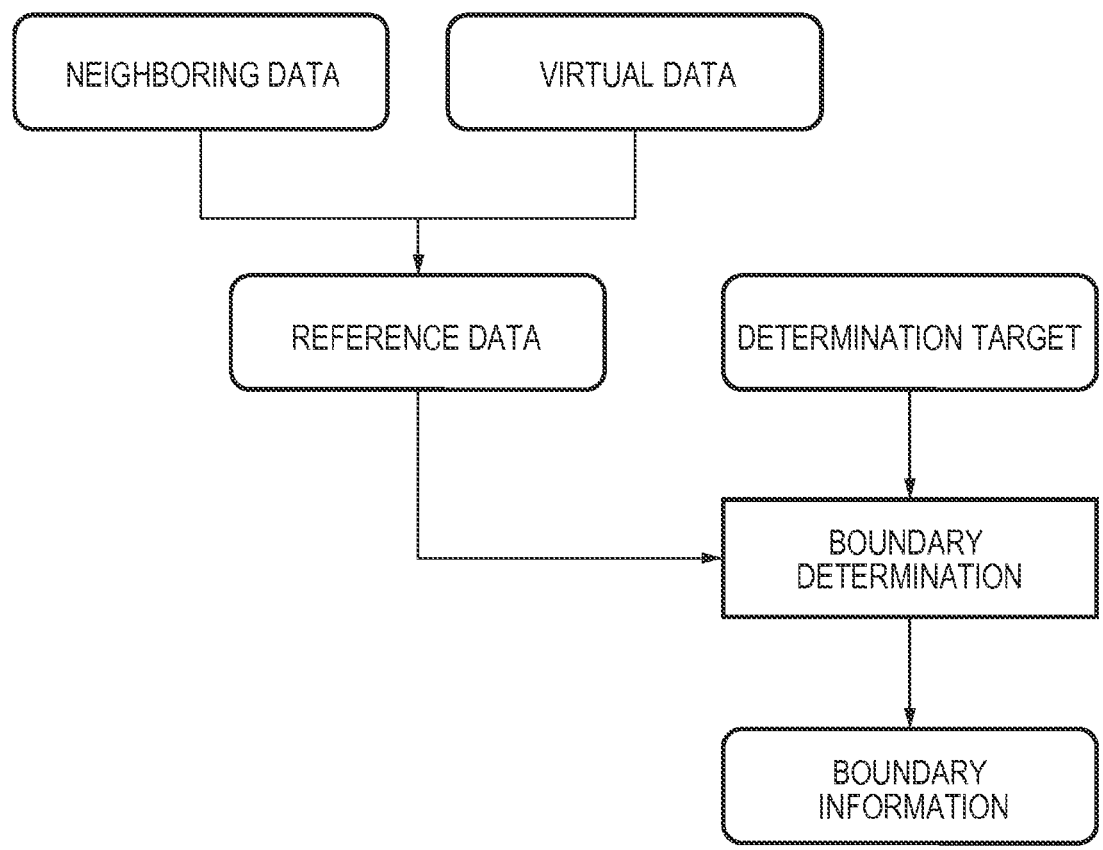
FIG. 10 is a view schematically showing the relationship between respective data associated with boundary determination.

FIG. 10 is a view schematically showing the relationship between respective data associated with boundary determination. In the first embodiment, "boundary information" is obtained by performing "boundary determination" of whether there is a boundary for the "determination target" in terms of the photographing interval. At this time, as shown in FIG. 10, "reference data" is used for boundary determination. The "reference data" is data generated from "virtual data" and "neighboring data", and data for defining a group division criterion in clustering processing. The neighboring data, virtual data, and reference data will be described below.

The "neighboring data" indicates a photographing interval near the determination target. In this example, the "neighboring data" indicates information about an interval positioned between the determination target and a boundary existing forward of the determination target. In other words, the "neighboring data" indicates a time interval between image data classified into the same group, which exists forward of the determination target. The neighborhood determination unit 304 (to be described later) determines whether the interval is the neighboring data.

The "virtual data" is data indicating a photographing trend prepared in advance. This data is prepared according to the granularity of a group to be created. For example, a standard photographing interval observed in each group is different depending on whether the user wants to create a group for each action such as movement, lunch, or sightseeing, or a group for a big event such as a trip of three days and two nights. Therefore, the virtual data is prepared according to the granularity of a group to be created.

Especially, in the first embodiment, the virtual data is prepared in advance as a list of photographing intervals. This designates a photographing trend by providing, as an example, a standard photographing interval occurring in a group. As in the second embodiment (to be described later), however, a statistic such as the average of photographing intervals may be provided as virtual data. This can designate the distribution of photographing intervals as a photographing trend. The form of a photographing trend as virtual data is not limited to them.

The "reference data" is data indicating an actual photographing trend on which a neighboring photographing interval is reflected. The reference data is obtained by updating the photographing trend indicated by the virtual data by the neighboring photographing interval. In the first embodiment, the reference data is prepared as a list of photographing intervals. This data is obtained by adding the photographing interval of the neighboring data to the list of photographing intervals included in the virtual data. Note that a statistic such as the average of photographing intervals may be provided as reference data, as in the second embodiment (to be described later).

The neighborhood determination unit 304 determines whether the photographing interval is close to the determination target. The neighboring data shown in FIG. 10 indicates a photographing interval determined as neighboring data by the neighborhood determination unit 304. More specifically, the neighborhood determination unit 304 determines, as neighboring data, an interval positioned between the determination target and a boundary existing forward of the determination target. For example, in the graph 400c, the neighboring data of the determination target interval 407 (photographing interval 407c) indicates seven intervals (photographing intervals 408c) between the determination target and the interval 406 (photographing interval 406c) as a forward boundary. Note that if no boundary exists forward of the determination target, intervals between the determination target and the first photographing interval (the interval between the first two image data in time-series) are preferably set as neighboring data.

The virtual data storage unit 305 holds virtual data in advance. As described above, in the first embodiment, the virtual data indicates a list of photographing intervals prepared in advance. The virtual data storage unit 305 is implemented by the external storage unit 104 or ROM 102. The reference data creation unit 306 creates reference data to be compared with the determination target. As described above, in the first embodiment, the reference data indicates a list of photographing intervals created based on the neighboring data and the virtual data.

The boundary determination unit 307 decides whether the determination target is a boundary. More particularly, the boundary determination unit 307 estimates a model preferably expressing the reference data by using the reference data. The boundary determination unit 307 uses the estimated model to determine the abnormality of the determination target data, thereby determining whether the determination target is a boundary.

In the first embodiment, photographing intervals assumed in a group are modeled using the log-normal distribution of the photographing intervals as a model. A photographing interval corresponding to a boundary is much longer than the photographing intervals in a group. Therefore, if a photographing interval corresponding to a boundary is applied to the model, the occurrence probability is very small. That is, it is determined whether the determination target is a boundary by deriving the occurrence probability. Note that since the occurrence probability takes a very low value, a negative log-likelihood is used.

More specifically, the parameters of the log-normal distribution are obtained from the reference data. After that, a negative log-likelihood for the determination target is obtained. If the negative log-likelihood is equal to or higher than a predetermined value, it is determined that the determination target is a boundary. The probability distribution of the log-normal distribution is given by $$f(x) = \frac{1}{\sqrt{2\pi\sigma^2}\,x} e^{-\frac{(ln(x)-\mu)^2}{2\sigma^2}} \quad (1)$$

When the determination target photographing interval is substituted for x, the occurrence probability is obtained.

Parameters $\mu$ and $\sigma^2$ are obtained by $$\mu = \frac{\sum_{t=1}^{n} \ln(x_t)}{n} \quad (2)$$

$$\xi = \frac{\sum_{t=1}^{n} \ln^2(x_t)}{n} \quad (3)$$

$$\sigma^2 = \xi - \mu^2 \quad (4)$$

In this case, the reference data are $\{x_1, x_2, \ldots, x_n\}$. For example, the parameter $\mu$ is obtained by the average of the logarithm of the photographing interval of the reference data.

The negative log-likelihood is derived by applying the logarithm to equation (1), and negating it, as given by $$L(x) = \frac{\ln(2\pi\sigma^2)}{2} + \ln(x) + \frac{(\ln(x) - \mu)^2}{2\sigma^2} \quad (5)$$

When the determination target is substituted for x, similarly to equation (1), the negative log-likelihood is obtained.

If the thus obtained negative log-likelihood is higher than a predetermined threshold, it is determined that the determination target is a boundary. Note that the log-normal distribution of the photographing intervals is used as a model in this example. However, another probability distribution such as an exponential distribution or normal distribution may be used as a model. Alternatively, another model such as an autoregressive model may be used.

Furthermore, it may be configured to adaptively change a model to be used in accordance with the granularity of a group to be created. When the granularity of a group is large, the number of short photographing intervals is much larger than that of long photographing intervals in the group. Therefore, a probability distribution in which a peak is positioned on the short photographing interval side and the value gradually decreases on the long photographing interval side can more preferably model the group. The log-normal distribution and exponential distribution have this tendency. It is thus possible to more appropriately model the group using these distributions. As a result, it can be expected to accurately create a group with large granularity.

On the other hand, when the granularity of a group is small, the photographing intervals in the group are less biased. The probability distribution having a peak at the average value of the photographing intervals is appropriate for modeling. The normal distribution has this tendency. It can be expected that it is possible to accurately create a group with small granularity using such distribution.

<Operation of Data Processing Apparatus>

Figure 5:
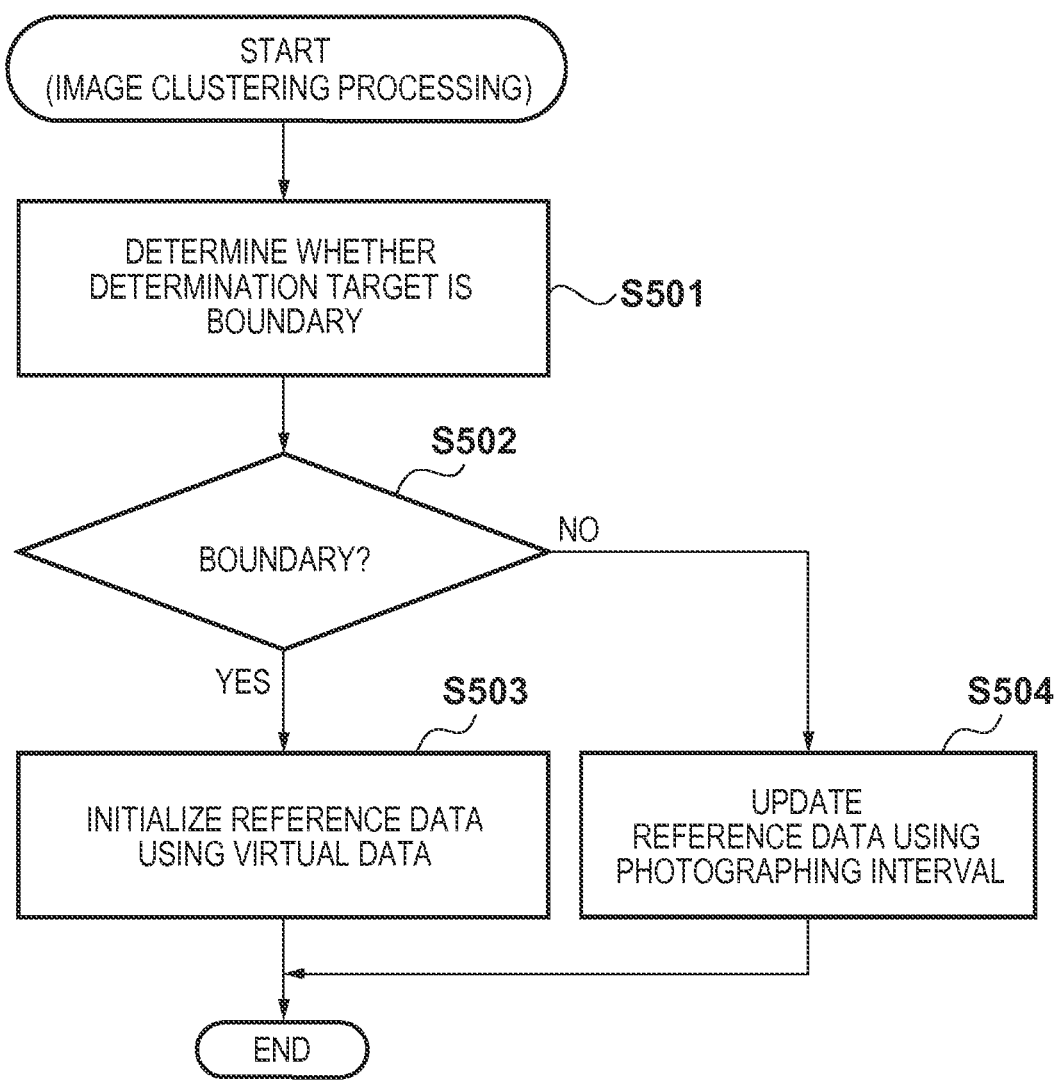
FIG. 5 is a flowchart illustrating image clustering processing.

FIG. 5 is a flowchart illustrating image clustering processing according to the first embodiment. This processing is executed when image data is photographed. Note that when image data is photographed for the first time, there is no determination target photographing interval, and thus this processing is not executed. When the second image data or subsequent image data is photographed, this processing is executed.

At the time of the start of execution of the image clustering processing, a determination target photographing interval is provided to the image clustering unit 303. In addition, reference data obtained when the processing was performed before is provided to the image clustering unit 303. The reference data obtained when the processing was performed before indicates reference data created in step S503 or S504 (to be described below) which was executed when the immediately preceding image was photographed. Note that when the image clustering processing is executed for the first time, there is no preceding reference data. When the processing is executed for the first time, therefore, reference data generated using virtual data is provided to the image clustering unit 303, similarly to step S503.

In step S501, the boundary determination unit 307 determines whether the determination target (photographing interval) provided at the time of the start of execution is a boundary. More specifically, the above-described parameters $\mu$ and $\sigma^2$ are obtained according to equations (2) to (4) by using the preceding reference data. Furthermore, a negative log-likelihood for the determination target photographing interval is obtained according to equation (5) by using the parameters. If the negative log-likelihood is higher than a predetermined threshold, it is determined that the determination target photographing interval is a boundary. Alternatively, in determination using a model, a significantly small value may also be determined as a boundary. In addition to the condition that the negative log-likelihood is higher, a condition that the photographing interval is equal to or longer than a predetermined threshold may be set. As the threshold, a predetermined value may be used or an average or quartile point may be used. In steps S502 to S504 below, reference data to be used for the next clustering processing is created.

In step S502, the neighborhood determination unit 304 determines whether the determination target is a boundary. More specifically, if the determination result in step S501 indicates a boundary, the process advances to step S503; otherwise, the process advances to step S504.

In step S503, the reference data creation unit 306 initializes the reference data using the virtual data. More specifically, the reference data creation unit 306 initializes the reference data by deleting the photographing intervals forming the reference data, and replacing them by photographing intervals forming the virtual data. That is, if it is determined in step S502 that the determination target is a boundary, "neighboring data included in the preceding reference data" and "the current determination target" are not neighboring data of "the next determination target". Consequently, reference data is created by only the virtual data without using any neighboring data.

In step S504, the reference data creation unit 306 updates the reference data using the determination target photographing interval. More specifically, the reference data creation unit 306 updates the reference data by newly adding the determination target photographing interval to the reference data indicating a list of photographing intervals. That is, if it is determined in step S502 that the determination target is not a boundary, "neighboring data included in the preceding reference data" and "the current determination target" are also the neighboring data of "the next determination target". Consequently, reference data is created by adding the determination target to the reference data.

Note that the image clustering processing need not be executed immediately after photographing. For example, the image clustering processing may be executed when a given time elapses after photographing. Alternatively, upon receiving an image group display instruction from the user, the image clustering processing may be executed.

<Effects>

Many of photographing intervals as "boundaries" are much longer than those (that is, photographing intervals which are not "boundaries") in a group. Therefore, when neighboring data includes a boundary, reference data includes an abnormal value, thereby disabling model estimation for boundary determination.

For example, in the log-normal distribution/normal distribution/exponential distribution, the average of data (in the case of the log-normal distribution, the average of the logarithm of data) or its equivalent is used to estimate the parameters of a model. Since, however, the average is readily influenced by an abnormal value, parameters cannot be correctly estimated. In the first embodiment, therefore, a photographing interval as a boundary is excluded from neighboring data. This can prevent the performance of boundary determination from decreasing.

By using both the neighboring data and the photographing intervals (virtual data) prepared in advance, it is determined whether the determination target is a boundary. With this processing, it is possible to perform determination using the virtual data even if there is no forward image data at the start of an image data row or immediately after a boundary. By forming the virtual data by photographing intervals according to a group to be created, it is possible to adjust the granularity of the group to be created. For example, by preparing the virtual data based on, for example, the average photographing interval of an assumed group, it is possible to perform clustering by a group with characteristics close to those of the assumed group.

It is also possible to adjust the influence of the virtual data by adjusting the number of photographing intervals forming the virtual data and the like. That is, if the number of photographing intervals of the virtual data is larger than that of the neighboring data, importance is attached to the virtual data rather than the neighboring data. On the other hand, if the number of photographing intervals of the virtual data is smaller, importance is attached to the neighboring data. This makes it possible to adjust the granularity of a group to be created.

Since clustering is performed by referring to only forward photographing intervals of the determination target, it is not necessary to refer to backward image data of the determination target. Therefore, it is not necessary to accumulate the backward image data of the determination target, and it is thus possible to provide a clustering result in real time. In addition, since no reference is made to backward data, even if image data is further added, a determination result does not change. Consequently, the created clustering result does not change, and thus it is possible to prevent the user from feeling that it is unnatural.

As described above, according to the first embodiment, by using, as reference data, neighboring data (the time interval between image data classified into the same group) existing forward of a determination target interval, it is determined whether the determination target is a boundary. This makes it possible to exclude information of a photographing interval as a boundary from the reference data, and to perform more preferable clustering.

(Second Embodiment)

In the second embodiment, a case in which a statistic such as the number of data or an average necessary for model estimation is used as reference data will be described. That is, although a list of photographing intervals is used for virtual data and reference data in the first embodiment, a statistic derived from a list of photographing intervals is used in the second embodiment. It is controlled to update the statistic every time a photographing interval is newly added.

<Arrangement of Image Management Program>

The arrangement of an image management program according to the second embodiment is the same as that in the first embodiment (FIG. 3). However, the functions of components are different. The components whose functions are different will be explained below.

A reference data creation unit 306 creates reference data to be compared with a determination target. In the above-described first embodiment, the reference data indicates a list of photographing intervals. In the second embodiment, however, when using a log-normal distribution, the number n of photographing intervals, an average $\mu$ of the logarithm of the photographing interval, and the mean square $\xi$ of the logarithm of the photographing interval are used as reference data.

The reference data creation unit 306 creates "new reference data" by considering a new photographing interval using "past reference data" and the "new photographing interval".

FIG. 6 is a table for explaining determination equations, parameters, reference data update equations, and virtual data for each probability distribution mode. For example, the reference data update equations of the log-normal distribution are as shown in FIG. 6. Note that n, $\mu$, and $\xi$ form reference data. The old reference data is added with a subscript "t" and the new reference data is added with a subscript "t+1". Note that $x_{t+1}$ is a variable indicating a new photographing interval.

A virtual data storage unit 305 holds virtual data in advance. In the second embodiment, the virtual data indicates the initial values of the reference data update equations. The virtual data changes depending on a model to be used by a boundary determination unit.

When, for example, the log-normal distribution is used, the virtual data are $n_0$, $\mu_0$, and $\xi_0$. For example, although the photographing interval list is used as virtual data in the above-described first embodiment, the photographing interval list may be used to generate these values. For example, $n_0$ represents the number of photographing intervals forming the photographing interval list. Similarly, $\mu_0$ represents the average of the logarithm of the photographing interval, and $\xi_0$ represents the mean square of the logarithm of the photographing interval. However, desired initial values may be appropriately set. A method of generating virtual data is not limited to them. The virtual data storage unit 305 stores and holds in advance the initial values in an external storage unit 104 or ROM 102.

A boundary determination unit 307 decides whether the determination target is a boundary. For example, when the log-normal distribution is used as a model, the parameters of the log-normal distribution are obtained based on the reference data. After that, a negative log-likelihood for the determination target is obtained. If the negative log-likelihood is equal to or higher than a predetermined value, it is determined that the determination target is a boundary. The probability distribution of the log-normal distribution is represented by f(x). Furthermore, an equation for providing the negative log-likelihood is represented by L(x). The parameter $\mu$ has the same value as that of the reference data. The parameter $\sigma^2$ can be obtained according to an equation shown in FIG. 6 based on $\mu$ and $\xi$ of the reference data.

Note that the reference data and virtual data are decided according to the probability distribution model used by the boundary determination unit 307. A case in which the log-normal distribution is used as a probability distribution model will be described. However, another normal distribution or exponential distribution can be used. It is possible to apply such distribution by using the equations corresponding to each probability distribution model shown in FIG. 6. The probability distribution model to be used is not limited to them.

<Image Clustering Processing>

Image clustering processing according to the second embodiment will be described with reference to the flowchart shown in FIG. 5, similarly to the first embodiment. The execution timing of this processing and data to be provided at the time of execution are the same as those in the first embodiment. Note that reference data includes the parameters n, $\mu$, and $\xi$ of the log-normal distribution, as described above.

In step S501, the boundary determination unit 307 determines whether a determination target provided at the time of the start of this processing is a boundary. More specifically, the parameters of the model are obtained according to the definition of the parameters shown in FIG. 6 using reference data obtained when the processing was performed before. Note that since $\mu$ and $\xi$ are already provided as described above, it is possible to immediately calculate the parameters $\mu$ and $\sigma^2$. A negative log-likelihood for the determination target photographing interval is obtained using the calculated parameters. If the calculated negative log-likelihood is higher than a predetermined threshold, it is determined that the determination target photographing interval is a boundary.

In step S502, a neighborhood determination unit 304 determines whether the determination target has been determined as a boundary in step S501. More specifically, if the determination result in step S501 indicates a boundary, the process advances to step S503; otherwise, the process advances to step S504.

In step S503, the reference data creation unit 306 initializes the reference data using virtual data. More specifically, the initial values held in the virtual data storage unit 305 are set as new reference data.

In step S504, the reference data creation unit 306 updates the reference data using the determination target photographing interval. More specifically, the reference data creation unit 306 creates "new reference data" according to the reference data update equations shown in FIG. 6 using the "determination target photographing interval" and the "current reference data". Note that the current reference data includes $n_t$, $\mu_t$, and $\xi_t$. The determination target photographing interval is represented by $x_{t+1}$. These parameters are substituted for the update equations, thereby obtaining $n_{t+1}$, $\mu_{t+1}$, and $\xi_{t+1}$ as "new reference data".

<Effects>

As described above, according to the second embodiment, a statistic is used as reference data. This can decrease the amount of data to be held, thereby suppressing the memory usage. In addition, since a statistic is calculated in advance as reference data, the cost of calculation of the parameters of the model is reduced.

By assuming the distribution of photographing intervals according to a group to be created, it is possible to provide virtual data by a smaller amount of data. For example, a list of photographing intervals can be represented by an average photographing interval (that is, $\mu$) in the assumed group. Furthermore, since it is possible to directly designate the number (that is, n) of photographing intervals, the influence of the virtual data is readily adjusted. This facilitates designation of the granularity of the group.

(Third Embodiment)

In the third embodiment, a case in which the existence of a determination error is considered will be described. In the above-described embodiments, all the photographing intervals immediately before the determination target are determined to be close to the determination target. If, therefore, a boundary is included due to a detection error, a value largely different from a statistic (for example, an average value) is included in neighboring data, which decreases the performance of boundary determination. In the third embodiment, a case in which preferred boundary determination is possible even if a boundary is included due to a detection error.

The arrangement of an image management program according to the third embodiment is almost the same as that shown in FIG. 3 of the first embodiment but the function of a neighborhood determination unit 304 is different. More specifically, under the following three conditions, the neighborhood determination unit 304 determines whether a photographing interval is close to a determination target.

The photographing interval is positioned between the determination target and a boundary as a photographing interval equal to or longer than a predetermined first time interval existing forward of the determination target (the first condition).

The photographing interval is shorter than a predetermined second time interval (the second condition).

The photographing interval is not a boundary (the third condition).

The photographing interval that satisfies all of the first to third conditions is determined to be close to the determination target. This is done by using the fact that when the granularity of a group is small, data are often divided at a short photographing interval and, as a result, the photographing trends of groups are similar to each other. By using, as neighboring data, a photographing interval that satisfies all of the first to third conditions, it is possible to share reference data among the groups which are obtained by dividing data by a boundary of a short photographing interval and whose photographing trends are similar to each other.

Note that although a boundary is a photographing interval equal to or longer than the predetermined first time interval in the first condition, a boundary of a long photographing interval may be specified by another method. For example, a long photographing interval may be specified using a model different from that used by the boundary determination unit. Similarly, although the photographing interval shorter than the predetermined second time interval is determined to be close to the determination target according to the second condition, a short photographing interval may be specified by another method. For example, a short photographing interval may be specified using a model different from that used by the boundary determination unit.

<Effects>

As described above, according to the third embodiment, while excluding a value largely different from a statistic (for example, an average value) from neighboring data, reference data is shared among a plurality of groups whose photographing trends are similar to each other. This can improve the accuracy of boundary determination.

(Fourth Embodiment)

In the fourth embodiment, a case in which virtual data is dynamically updated will be described. In the above-described embodiments, it is necessary to prepare in advance virtual data according to the granularity of a group to be created. The virtual data prepared in advance is fixed. However, it is not always possible to prepare appropriate virtual data for an image data group to be clustered. In the fourth embodiment, boundary determination is performed again by also referring to backward photographing intervals of a determination target. When the determination result does not coincide with that by an image clustering unit, the virtual data is updated.

<Arrangement of Image Management Program>

Figure 7:
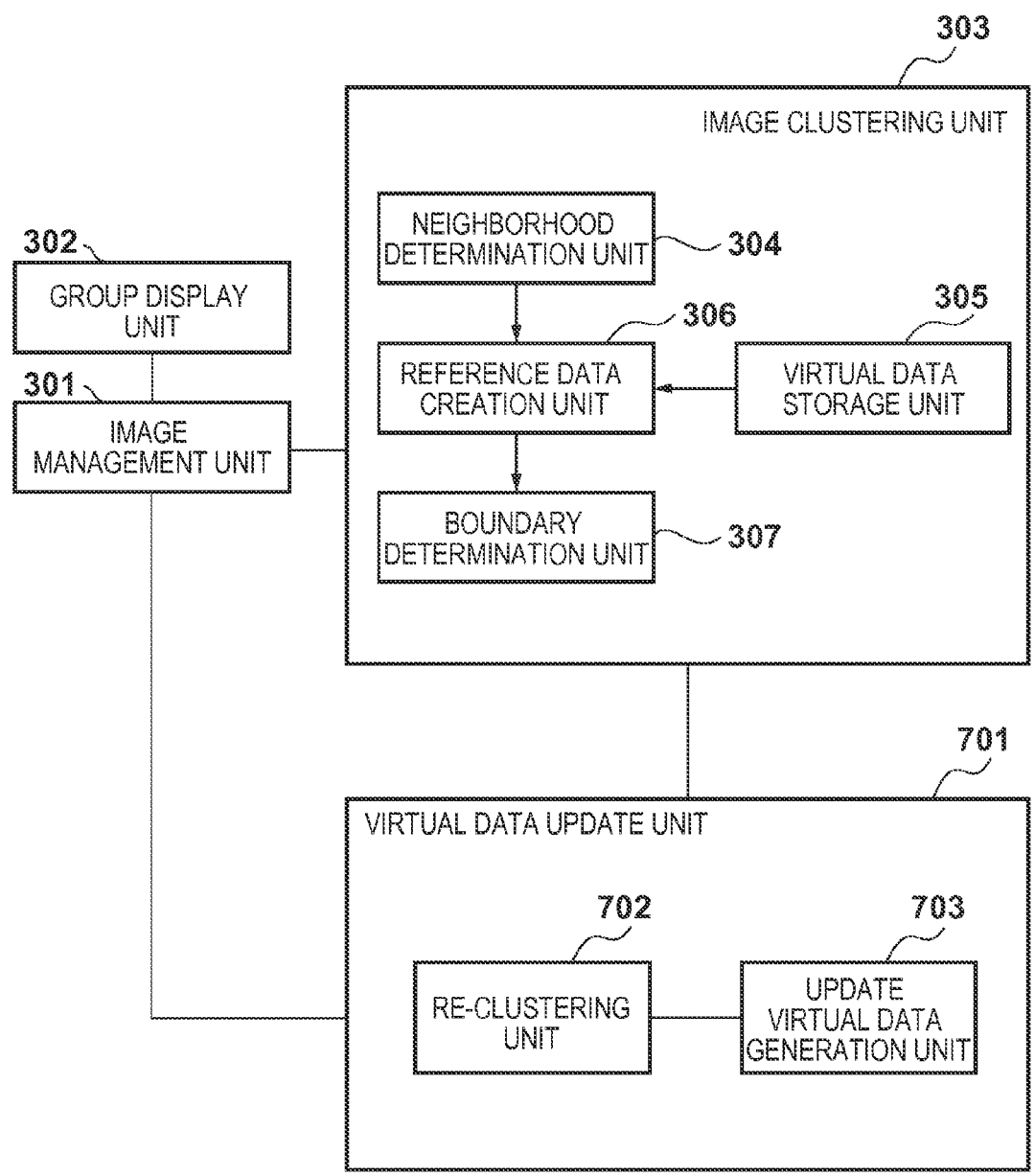
FIG. 7 is a block diagram showing the arrangement of an image management program (fourth embodiment)

FIG. 7 is a block diagram showing the arrangement of an image management program according to the fourth embodiment. Note that the arrangement is the same as that shown in FIG. 3 except that a virtual data update unit 701 is added. A description of the same components will be omitted.

The virtual data update unit 701 serves as a function unit for updating virtual data. More specifically, a re-clustering unit 702 performs boundary determination (re-clustering) by also referring to backward photographing intervals of a determination target. If boundary determination result by an image clustering unit 303 does not coincide with that by the re-clustering unit 702, an update virtual data generation unit 703 generates new virtual data for update.

A boundary determination method by the re-clustering unit 702 is similar to that by the image clustering unit 303. However, the re-clustering unit 702 uses a neighboring data acquisition method different from that used by the image clustering unit 303.

More specifically, the re-clustering unit 702 also acquires the backward photographing intervals of the determination target as neighboring data. For example, the re-clustering unit 702 determines "photographing intervals from a forward boundary of the determination target to the determination target" and "photographing intervals from the determination target to a backward boundary of the determination target" as neighboring data, thereby acquiring neighboring data. Alternatively, the neighborhood conditions described in the third embodiment may be considered. A neighboring data acquisition method is not limited to them.

Reference data is generated using the reference data update equations shown in FIG. 6. In the fourth embodiment, assume that boundary determination is performed using the log-normal distribution. Therefore, the virtual data includes $n_0$, $\mu_0$, and $\xi_0$. Reference data is created by using neighboring data $\{x_1, x_2, \ldots, x_m\}$, and sequentially applying values 1 to m-1 to t of the reference data update equations.

Parameters are obtained, and $L(x)$ is obtained where x represents the determination target photographing interval. If $L(x)$ is equal to or larger than a predetermined threshold, it is determined that the determination target is a boundary.

Note that in addition to the log-normal distribution, a normal distribution, exponential distribution, or the like may be used as a probability distribution model used by the re-clustering unit 702. Alternatively, an autoregressive model or the like may be used. The re-clustering method is not limited to these models used for boundary determination.

Note that the virtual data is acquired from a virtual data storage unit 305. Alternatively, virtual data prepared in advance may be used in addition to that stored in the virtual data storage unit 305. Alternatively, it is not necessary to use the virtual data. If no virtual data is used, the values of $n_0$, $\mu_0$, $\xi_0$, and the like need only be set to "0".

The update virtual data generation unit 703 acquires the existing virtual data from the virtual data storage unit 305, and generates new virtual data. Similarly to the above-described second embodiment, the virtual data indicates the initial values of reference data.

In this case, the existing virtual data is updated using the photographing intervals (neighboring data) used for redetermination. For example, when the log-normal distribution is used as a model in the image clustering unit 303, the existing virtual data includes $n_0$, $\mu_0$, and $\xi_0$. Assume that the photographing intervals used for redetermination are $\{x_1, x_2, \ldots, x_m\}$. In this case, it is possible to generate new virtual data from the existing virtual data by sequentially applying values 1 to m-1 to t of the reference data update equations.

The number n of data of the virtual data is returned to the value of the existing virtual data. If the number n of data of the virtual data becomes too large, the influences of the neighboring data and virtual data lose their balance. To solve this problem, in the fourth embodiment, the number n of data is returned to an original numerical value.

Virtual data may be generated using another method, as a matter of course. For example, new virtual data may be created without using the existing virtual data. For example, new virtual data can be generated by setting $n_0$, $\mu_0$, and $\xi_0$ to 0, and applying the reference data update equations in the same manner.

Alternatively, virtual data may be generated without using the photographing intervals used for redetermination. For example, virtual data may be generated by setting the number n of data to be small. This can decrease the influence of the virtual data.

Alternatively, if the determination result of the image clustering unit changes "from a boundary to a non-boundary" by reevaluation, it is considered that an error has occurred because the photographing interval represented by the virtual data is too short. To solve this problem, the photographing interval represented by the virtual data is made longer. For example, the photographing interval is made longer by multiplying the parameters $\mu$ and $\xi$ by a magnification larger than 1. To the contrary, if the determination result changes "from a non-boundary to a boundary", it is considered that an error has occurred because the photographing interval represented by the virtual data is too long. To solve this problem, the photographing interval represented by the virtual data is made shorter by a small amount. For example, the photographing interval is made shorter by multiplying the parameters μ and ξ by a magnification smaller than 1. New virtual data may be generated by adjusting the existing virtual data, as described above.

When the virtual data indicates photographing interval list as in the first embodiment, new virtual data may be obtained by adding photographing intervals used for redetermination. Alternatively, a priority level for a registration order may be assigned to each photographing interval included in the existing list, data with low priority levels may be deleted, and then the photographing intervals used for redetermination may be added.

It is not necessary to use all the photographing intervals used for redetermination to generate virtual data for update. For example, only the backward photographing intervals of the determination target may be used. Alternatively, photographing intervals equal to or longer than a given threshold may be removed. There are various methods of generating update virtual data, and the present invention is not limited to the above-described methods.

Boundary information selection processing will be described with reference to a flowchart shown in FIG. 8A, and virtual data update processing will be explained with reference to a flowchart shown in FIG. 8B.

When image data is photographed, the virtual data update unit 701 executes the boundary information selection processing. Alternatively, a given number of image data are photographed, the boundary information section processing may be executed. In the boundary information selection processing, pieces of boundary information managed by an image management unit 301 are sequentially selected, and the virtual data update processing is applied.

Step S801a indicates the start position of a loop of sequentially selecting the pieces of boundary information managed by an image management unit 301. Step S806a indicates the end of the loop that has started in step S801a. If there is boundary information which has not been selected among the pieces of boundary information managed by the image management unit 301, the virtual data update unit 701 selects the boundary information, and the process advances to step S802a. When all the pieces of boundary information are selected, the process exits from the loop to terminate this processing.

In step S802a, the virtual data update unit 701 determines whether the virtual data update processing has been applied to the boundary information selected in step S801a. More specifically, a processed flag is provided to each piece of boundary information managed by the image management unit 301, and the above determination processing is performed according to whether there is data whose processed flag is OFF. Note that upon obtaining the boundary information from the image clustering unit 303, the image management unit 301 holds the information by turning off its processed flag.

If the virtual data update unit 701 determines in step S802a that the virtual data update processing has not been applied (the processed flag of the boundary information is OFF), the process advances to step S803a; otherwise, the process advances to step S806a.

If the photographing interval of the boundary information is set as a determination target, the virtual data update unit 701 determines in step S803a whether there is an enough backward photographing interval. More specifically, the virtual data update unit 701 determines whether a boundary exists backward of the determination target. If a boundary exists, the process advances to step S804a; otherwise, the process advances to step S806a.

In step S804a, the virtual data update unit 701 applies the virtual data update processing to the boundary information. In step S805a, the virtual data update unit 701 turns on the processed flag of the processed boundary information.

Figure 8B:
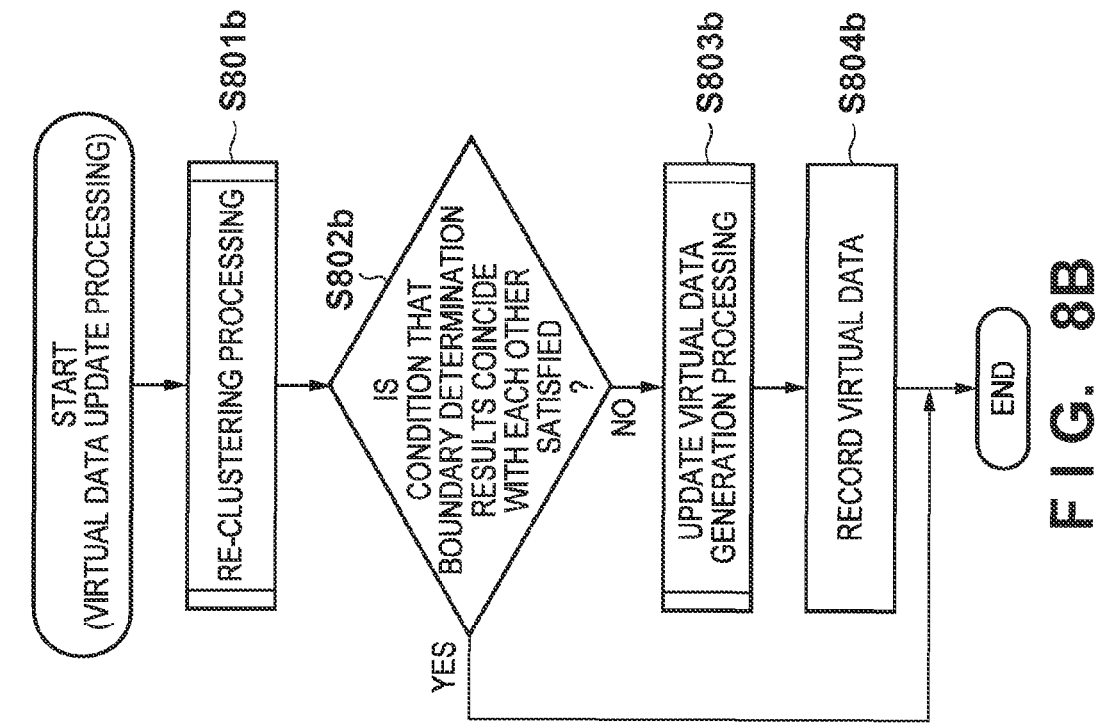
FIGS. 8A and 8B are flowcharts illustrating boundary information selection processing and virtual data update processing, respectively.
Figure 8A:
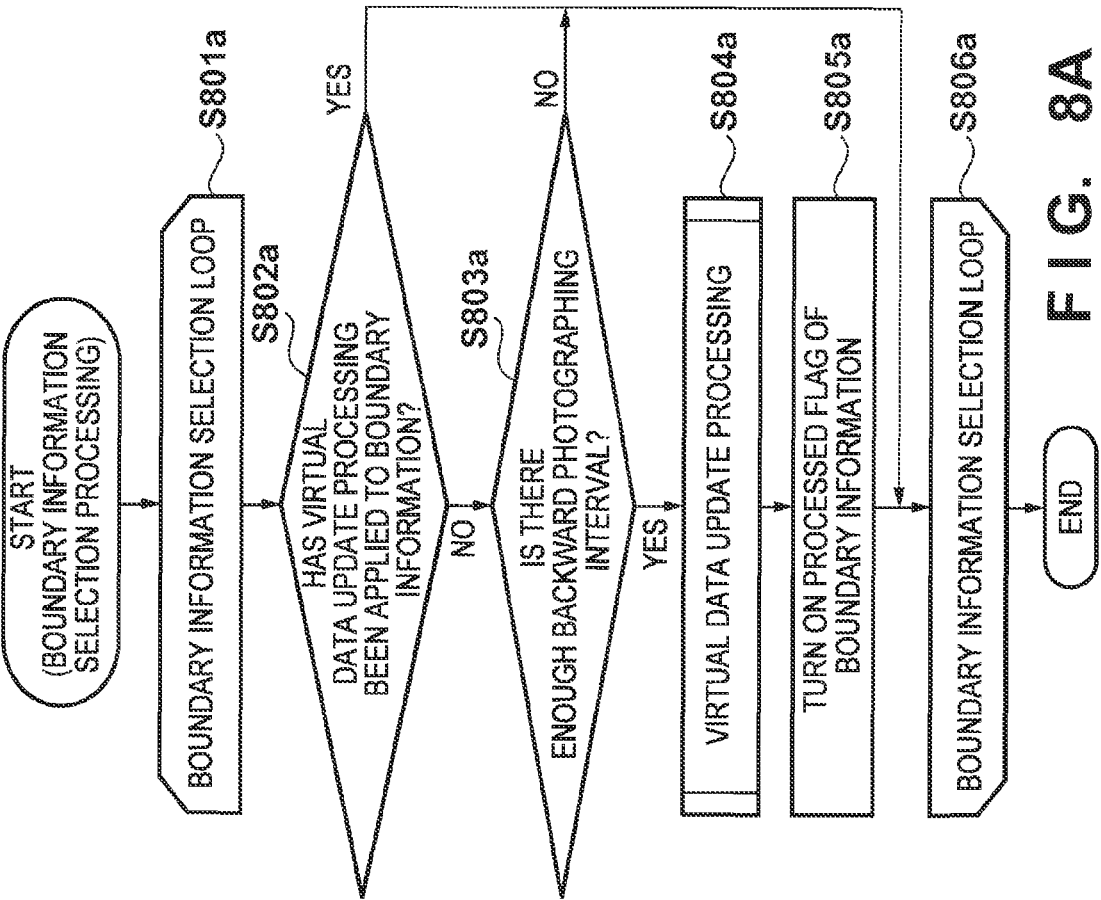

FIG. 8B is a flowchart illustrating the virtual data update processing in detail. The virtual data update unit 701 executes the virtual data update processing. To execute this processing, the existing virtual data and the boundary information selected in the boundary information selection processing (FIG. 8A) are provided.

In step S801b, the virtual data update unit 701 performs re-clustering processing. More specifically, the virtual data update unit 701 sets, as a determination target, the photographing interval indicated by the boundary information, and determines whether the determination target is a boundary. Especially, the determination processing is performed by also referring to backward photographing intervals of the determination target photographing interval. Details of the re-clustering processing will be described later with reference to FIG. 9A.

In step S802b, the virtual data update unit 701 determines whether an existing boundary determination result coincides with the boundary determination result in step S801b. More specifically, the virtual data update unit 701 determines whether the presence/absence of a boundary indicated by the boundary information coincides with the determination result in step S801b. If the determination results do not coincide with each other, the process advances to step S803b; otherwise, the process ends.

In step S803b, the virtual data update unit 701 performs processing of generating update virtual data. More specifically, new virtual data is generated based on the existing virtual data using the photographing interval used for the re-clustering processing in step S801b. Details of the processing of generating update virtual data will be described later with reference to FIG. 9B.

In step S804b, the virtual data update unit 701 stores the update virtual data generated in step S803b in the virtual data storage unit 305.

Note that only if it is determined in step S802b that the boundary determination results do not coincide with each other, the virtual data is updated. However, even if the boundary determination results coincide with each other, the virtual data may be updated.

Figures 9A, 9B:
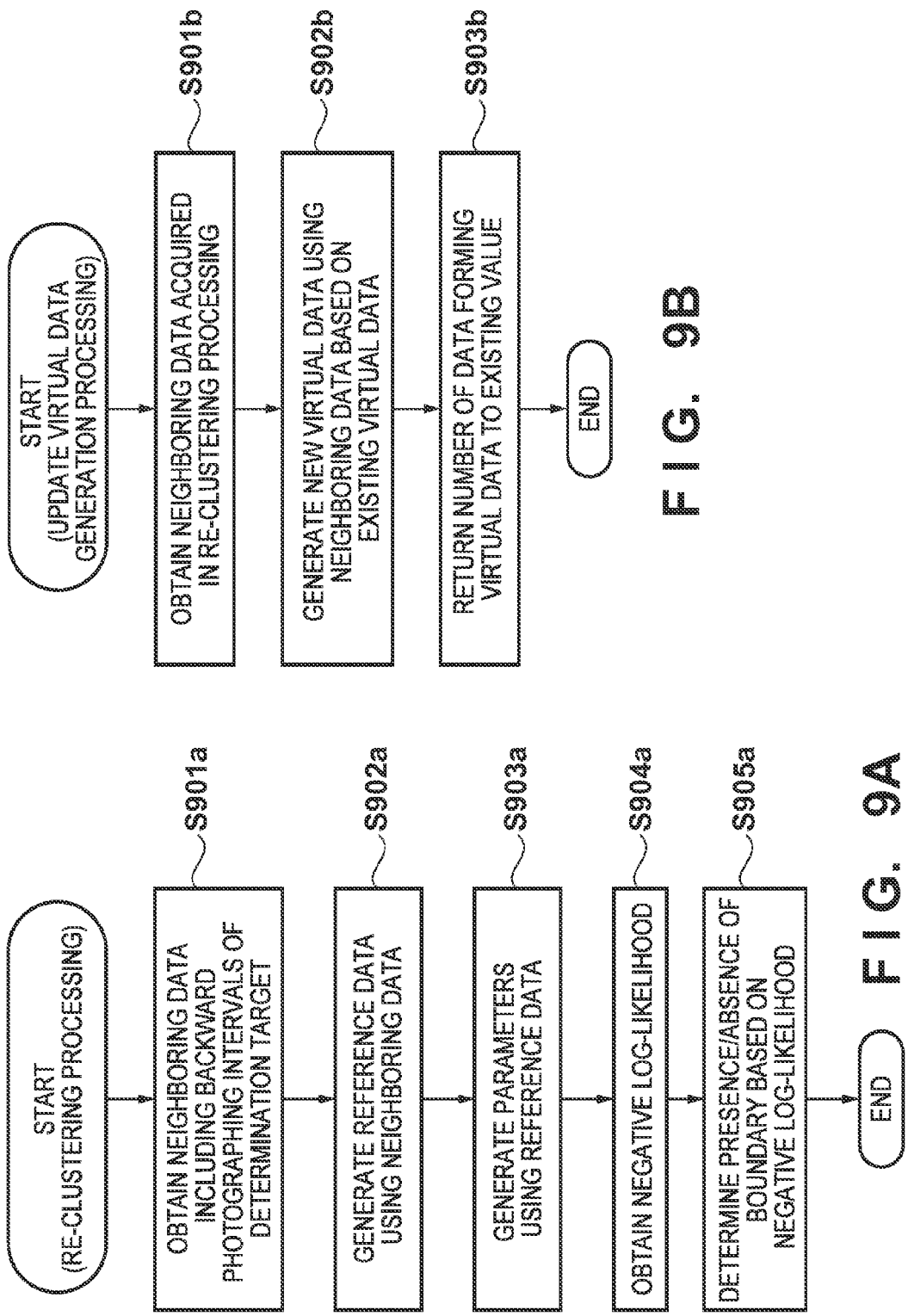
FIGS. 9A and 9B are flowcharts illustrating re-clustering processing and update virtual data generation processing, respectively.

The re-clustering processing will be described with reference to a flowchart shown in FIG. 9A. The update virtual data generation processing will be explained with reference to a flowchart shown in FIG. 9B.

The re-clustering unit 702 executes the re-clustering processing. To execute the re-clustering processing, the determination target and the existing virtual data are provided. Assume that forward and backward photographing intervals of the determination target and the presence/absence of a boundary are acquired from the image management unit 301, as needed.

In step S901a, the re-clustering unit 702 acquires the photographing intervals including the backward photographing intervals of the determination target, and uses them as neighboring data. More specifically, the re-clustering unit 702 acquires photographing intervals "from a forward boundary of the determination target to the determination target" and those "from the determination target to a backward boundary of the determination target", and use them as neighboring data.

In step S902a, the re-clustering unit 702 generates reference data using the neighboring data. More specifically, the re-clustering unit 702 generates reference data using the reference data update equations shown in FIG. 6. That is, assume that the neighboring data are $\{x_1, x_2, \ldots, x_m\}$. Furthermore, $n_0$, $\mu_0$, and $\xi_0$ represent the values of the provided virtual data. Then, reference data is created by sequentially applying values 1 to m-1 to t of the reference data update equations.

In step S903a, the re-clustering unit 702 obtains the parameters of a model. According to the equation shown in FIG. 6, $\sigma^2$ is generated using the parameters $\xi$ and $\mu$. As the parameter $\mu$, the value obtained for the reference data is used intact.

In step S904a, the re-clustering unit 702 obtains a negative log-likelihood according to L(x). More specifically, the value of L(x) is obtained where x represents the determination target photographing interval.

If the negative log-likelihood obtained in step S904a is equal to or higher than a predetermined value, the re-clustering unit 702 determines in step S905a that the determination target photographing interval is a boundary. On the other hand, if the negative log-likelihood is lower than the predetermined value, the re-clustering unit 702 determines that the determination target photographing interval is not a boundary.

The update virtual data generation unit 703 executes the update virtual data generation processing. To execute the update virtual data generation processing, the existing virtual data is provided.

In step S901b, the update virtual data generation unit 703 obtains the neighboring data acquired in the re-clustering processing. More specifically, the update virtual data generation unit 703 obtains the neighboring data obtained in step S901a.

In step S902b, the update virtual data generation unit 703 generates new virtual data using the neighboring data obtained in step S901b based on the provided existing virtual data. For example, if the image clustering unit 303 has performed boundary determination using the log-normal distribution model, the existing virtual data indicates $n_0$, $\mu_0$, and $\xi_0$. New virtual data is generated based on the existing virtual data by using neighboring data $\{x_1, x_2, \ldots, x_m\}$, and sequentially applying values 1 to m-1 to t of the reference data update equations.

In step S903b, the update virtual data generation unit 703 returns the number n of data, of the virtual data generated in step S902b, to the value of the existing virtual data.

Note that even if the boundary determination result of the re-clustering unit 702 is different from that of the image clustering unit 303, modification is not particularly performed. If, however, the boundary determination results are different from each other, the boundary determination result may be modified to that of the re-clustering unit 702. When, for example, it is recognized that no display of a group is performed yet, even if pieces of boundary information generated while no display of the group is performed are changed, the user never feels that it is unnatural.

<Effects>

As described above, according to the fourth embodiment, the virtual data update unit 701 compares the boundary determination result of the image clustering unit 303 with that of the re-clustering unit 702. If the boundary determination results do not coincide with each other, the virtual data is updated. This reflects, on the virtual data, a photographing interval around a position where a boundary determination error has occurred, thereby decreasing the probability of an error in subsequent boundary determination.

(Modification)

In the above-described embodiment, image data are added in the photographing order. However, image data may be inserted to the middle of an image data row in which image data are arranged in the photographing order. For example, when receiving image data from another image capturing apparatus via a communication unit 108, the new image data may be inserted to the middle of an existing image data row. In this case, photographing intervals immediately before and after the insertion position are considered to have newly occurred, and boundary determination need only be performed by setting each of the photographing intervals as a determination target.

In the above-described embodiment, the neighboring data indicates a photographing interval between image data. However, image data itself may be used as neighboring data. In this case, the neighborhood determination unit may determine the neighborhood by referring to the photographing times of the respective image data. More specifically, an appropriate time between two image data forming the determination target is set as a determination time. For example, the photographing time of the forward image data forming the determination target is set as a determination time. An intermediate time between the photographing times of the two image data forming the boundary is set as a boundary time. Then, image data having a photographing time after the boundary time and before the determination time is determined to be close to the determination target, and the image data obtained by this processing is set as neighboring data. At this time, the reference data creation unit performs conversion into a photographing interval, thereby creating reference data, similarly to the above-described embodiment. After that, similarly to the above-described embodiment, the boundary determination unit preferably determines the presence/absence of a boundary using the reference data.

The image data themselves may be used for boundary determination. For example, the photographing time of newly added image data is compared with that of image data forming the neighboring data. If the photographing time of the new image data is later than the predetermined boundary time, a boundary is determined. For example, an apparent time such as the starting time of an office at which an event is switched is set in advance as a boundary time. Instead of the interval data, the image data may be used as neighboring data used for boundary determination.

In the above-described embodiment, the photographing interval between two image data (the difference between pieces of photographing time information) is used. However, another interval data may be used. For example, the difference between the photographing positions of two image data may be used as interval data. The difference between the photographing parameters (EV values or the like) of two image data may be used as interval data. A difference in image feature amount (similarity) may be used as interval data. By using the difference in photographing position, it is possible to set a boundary when the user largely moves. By using the difference in photographing parameter, it is possible to set a boundary when ambient light largely changes, for example, from inside to outside. By using the similarity of the image feature amounts, it is possible to set a boundary when the outer appearance largely changes. As described above, it is possible to define the interval data as the difference between the attribute values of two image data adjacent to each other in time-series.

In the above-described embodiment, image data are mainly used. The present invention, however, is also applicable to arbitrary data arranged in time-series. For example, data such as the operation history of a PC or device may be targeted. In this case, the difference between times corresponding to respective operations can be used as interval data. This makes it possible to obtain a temporally continuous operation row.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-239237, filed Nov. 19, 2013, which is hereby incorporated by reference herein in its entirety.

What is claimed is:

1. A data processing apparatus comprising:
a clustering unit configured to cluster at least one data arranged in time-series;
a generation unit configured to, if new data is added, generate a reference value for defining a group division criterion in the clustering using at least one existing data that exists forward of the new data in time-series after a forward boundary;
a determination unit configured to determine based on the reference value whether a group division boundary exists between the new data and existing data positioned immediately before the new data;
a storage unit configured to hold virtual data for defining a group division criterion in the clustering;
a re-clustering unit configured to execute re-clustering for each of the at least one data arranged in time-series based on at least one data that exists backward in time-series before a backward boundary; and
a virtual data update unit configured to, when a group division determination result of said re-clustering unit is different from a group division determination result of said determination unit, update the virtual data based on data of each group according to the determination result of said re-clustering unit,
wherein when no existing data exists, said generation unit generates the reference value based on the virtual data, and when the existing data exists, said generation unit generates the reference value using the virtual data and the at least one existing data that exists forward of the new data in time-series after the forward boundary.

2. The apparatus according to claim 1, wherein
each of the at least one data includes time information,
said generation unit generates the reference value based on a difference in time information between data adjacent to each other in time-series of the at least one existing data that exists forward of the new data in time-series after the forward boundary, and
said determination unit determines whether a group division boundary exists between the new data and the existing data positioned immediately before the new data by comparing the reference value with the difference in time information between the new data and the existing data positioned immediately before the new data.

3. The apparatus according to claim 2, further comprising an update unit configured to, when said determination unit determines that no group division boundary exists between the new data and the existing data positioned immediately before the new data, update the reference value using the difference between the new data and the existing data positioned immediately before the new data.

4. The apparatus according to claim 3, wherein
the reference value indicates a list of differences in time information between data adjacent to each other in time-series of the at least one existing data that exists forward of the new data in time-series after the forward boundary, and
said update unit updates the reference value by adding, to the reference value, the difference between the new data and the existing data positioned immediately before the new data.

5. The apparatus according to claim 3, wherein
the reference value indicates a statistic of a list of differences in time information between data adjacent to each other in time-series of the at least one existing data that exists forward of the new data in time-series after the forward boundary, and
said update unit updates the reference value based on the difference between the new data and the existing data positioned immediately before the new data.

6. The apparatus according to claim 1, wherein
each of the at least one data is photo image data generated by an image capturing apparatus,
said generation unit generates the reference value based on a difference in attribute value or image feature amount between data adjacent to each other in time-series of the at least one existing data that exists forward of the new data in time-series after the forward boundary, and
said determination unit determines whether a group division boundary exists between the new data and the existing data positioned immediately before the new data by comparing the reference value with the difference in attribute value or image feature amount between the new data and the existing data positioned immediately before the new data.

7. The apparatus according to claim 6, wherein the attribute value includes one of a photographing time, a photographing position, and a photographing parameter.

8. The apparatus according to claim 1, wherein said determination unit determines whether a group division boundary exists between the new data and the existing data positioned immediately before the new data by comparing a distribution model using the reference value of the existing data with the difference between the new data and the existing data positioned immediately before the new data.

9. A data processing method of clustering at least one data arranged in time-series, the data processing method comprising:
   generating, if new data is added, a reference value for defining a group division criterion in the clustering using at least one existing data that exists forward of the new data in time-series after a forward boundary;
   determining based on the reference value whether a group division boundary exists between the new data and existing data positioned immediately before the new data;
   holding virtual data for defining a group division criterion in the clustering;
   executing re-clustering for each of the at least one data arranged in time-series based on at least one data that exists backward in time-series before a backward boundary; and
   updating, when a group division determination result of the executing re-clustering is different from a group division determination result of the determining, the virtual data based on data of each group according to the determining,
   wherein when no existing data exists, generating the reference value based on the virtual data, and when the existing data exists, generating the reference value using the virtual data and the at least one existing data that exists forward of the new data in time-series after the forward boundary.

10. A non-transitory computer-readable recording medium storing a program that causes a computer to execute a data processing method of clustering at least one data arranged in time-series, the data processing method comprising:
   generating, if new data is added, a reference value for defining a group division criterion in the clustering using at least one existing data that exists forward of the new data in time-series after a forward boundary;
   determining based on the reference value whether a group division boundary exists between the new data and existing data positioned immediately before the new data;
   holding virtual data for defining a group division criterion in the clustering;
   executing re-clustering for each of the at least one data arranged in time-series based on at least one data that exists backward in time-series before a backward boundary; and
   updating, when a group division determination result of the executing re-clustering is different from a group division determination result of the determining, the virtual data based on data of each group according to the determining,
   wherein when no existing data exists, generating the reference value based on the virtual data, and when the existing data exists, generating the reference value using the virtual data and the at least one existing data that exists forward of the new data in time-series after the forward boundary.

* * * * *